US006720910B2

United States Patent
Yu

(12) United States Patent
(10) Patent No.: US 6,720,910 B2
(45) Date of Patent: Apr. 13, 2004

(54) PRI-STAGGERED POST-DOPPLER ADAPTIVE MONOPULSE PROCESSING FOR DETECTION AND LOCATION OF A MOVING TARGET IN GROUND CLUTTER

(75) Inventor: Kai-Bor Yu, Niskayuna, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/930,891

(22) Filed: Aug. 16, 2001

(65) Prior Publication Data

US 2003/0117314 A1 Jun. 26, 2003

(51) Int. Cl.[7] .......................... G01S 13/52; G01S 13/00
(52) U.S. Cl. ..................... 342/162; 342/152; 342/194
(58) Field of Search ............................... 342/149, 160, 342/162, 152, 194

(56) References Cited

U.S. PATENT DOCUMENTS

| | | | | |
|---|---|---|---|---|
| 4,809,002 A | * | 2/1989 | Togashi et al. | 342/160 |
| 5,173,700 A | * | 12/1992 | Chesley | 342/149 |
| 5,892,478 A | * | 4/1999 | Moss | 342/140 |
| 6,362,781 B1 | * | 3/2002 | Thomas et al. | 342/367 |
| 6,404,379 B1 | * | 6/2002 | Yu et al. | 342/147 |

OTHER PUBLICATIONS

"Clutter mitigation techniques for space–based radar," Kogon, S.M.; Rabideau, D.J.; Barnes, R.M. Acoustics, Speech, and Signal Processing, 1999. Proceedings., 1999 IEEE International Conference on, vol.: 4, 1999 pp.: 2323–2326 vol. 4.*

A Signal Processing Architecture for Space–Based GMTI Radar, Proceedings of the 1999 IEEE Radar Conference, Daniel J. Rabideau et al, Apr. 20–22, 1999, pp 96–101.

Adaptive Arrays in Airborne MTI Radar Lawrence E. Brennan, et al., IEEE Trans. Antenna & Propopation, vol. AP–24, Sep. 1976, pp 607–615.

Ground and Airborne Target Detection with Bistatic Adaptive Space–Based Radar, R.L. Fante, proceedings of the 1999 IEEE Radar Conference, Apr. 20–22, 1999, pp 7–11.

* cited by examiner

Primary Examiner—Thomas H. Tarcza
Assistant Examiner—Brian Andrea
(74) Attorney, Agent, or Firm—Patrick M. Hogan

(57) ABSTRACT

A method, apparatus, and processing system for radar detection and tracking of a target using monopulse ratio processing comprising the following steps. First, receiving a signal comprised of a plurality of sum azimuth beams and difference azimuth beams. Then staggering the received signal. Next, filtering and localizing a clutter signal which is a portion of the received sum and azimuth beams. Then adaptively forming a sub-array sum azimuth beam and a sub-array difference azimuth beam from the filtered output to cancel the clutter. The adaptive beam forming including the determination of a sum and difference beam weight where the adaptive weight be equated to a product of the weight and the respective covariance matrices of the sum and difference beams, the product having no constraint points. Finally, forming a final sum azimuth beam and final difference beam where the first sub array is related to the sum and azimuth beams of a plurality of other sub-array sum and difference beams, an overall final sum beam is formed and is used for target detection. In addition, an overall final difference beam is formed and the ratio of the overall final difference beam to the overall final sum beam is used for angle location determination.

24 Claims, 3 Drawing Sheets

PRI-STAGGERED POST-DOPPLER ADAPTIVE MONOPULSE PROCESSING FOR DETECTION AND LOCATION OF A MOVING TARGET IN GROUND CLUTTER

FIELD OF THE INVENTION

This invention is directed to the cancellation of clutter surrounding moving objects in radar applications preserving a usable monopulse ratio to be formed using adaptive processing techniques, and allowing both detection and angle location determination of objects in the radar image.

BACKGROUND OF THE INVENTION

The problem of canceling clutter surrounding an object to be resolved in a radar image is a constant struggle for all radar applications. Specifically, clutter arises often times in space borne or in airborne radar systems when imaging the surface of the earth. In these applications the ground clutter must be suppressed for target detection, and the angular location of the object must be determined accurately to enable tracking of the object. Commonly, space-time adaptive processing (STAP) is utilized for target detection, where a sum beam is adaptively beam formed. However in order to perform target tracking, or angle location using a monopulse ratio, a ratio of adaptive difference beam to adaptive sum beam needs to be determined, which requires the further calculation of a difference beam. Unfortunately, as a result of the commonly used STAP processing, any monopulse ratio that could be developed would be distorted by the adaption due to mainlobe clutter. This ratio is so distorted by the clutter that it cannot be used for target angle location determination.

There is a keen interest in space-based radar platforms for large area surveillance. A space-based platform is able to provide a much greater coverage area than the traditional airborne platforms. For example space-based platforms have unlimited access to any location on the earth whereas airborne platforms may not. The main challenge to any of these systems has been the elimination of the ground clutter for detection and location of targets. This problem, which is present in all radars, is then heightened when the relative velocities of the object to the space-borne platform is great. This relative velocity is extremely large when the radar system is in orbit around the earth traveling at around 7500 m/sec and the object being detected and tracked is on the earth traveling at around 20 MPH. In such instances the object being detected and tracked is often completely obscured by ground clutter and it is very difficult to form a useable radar image of the object. Additionally, there is the possibility that the object itself is actively transmitting a jamming signal to prevent its discovery. Both the ground clutter and the jamming signal have some value of jamming power (J) associated with them. These are distinguished by one being actively produced while the other is a product of environmental factors. However, their effect is essentially the same, resulting in poor image quality and an inability to view the intended area.

There have been extensive studies of space-based radar for moving target imaging (MTI). Some of these studies include using STAP for ground clutter cancellation, as discussed above, and the use of Periodic Repetition Interval (PRI)-staggered post-Doppler filter banks. Ground moving target imaging (GMTI) is also known, as well as adaptive monopulse processing techniques based upon constraint optimization. However, the prior art does not discuss utilization of a variety of these techniques simultaneously, and is mainly focused on adaptive clutter cancellation for target detection and not for angle location purposes. Therefore there is a need to achieve both tracking and detection in a single unit.

One known technique for STAP optimization or clutter cancellation involves a tedious two-step procedure involving large size STAP optimization. The processing procedure initially involves an unconstrained adaptation of the sum beam. Secondly the difference beam is then adapted to minimize the output clutter. However, this difference beam clutter minimization is subject to the limitation that the monopulse values must be preserved at several target angles (constraint points), which results in increased utilization of resources (i.e. the adaptive degrees of freedom), and more importantly has been ineffective in producing and preserving a usable monopulse ratio. Moreover, this technique has not proven to be effective for the accommodation of mainlobe clutter cancellation.

SUMMARY OF THE INVENTION

It is an object of the present invention to provide a method for determination of a single sum and difference beam weight by taking data samples, determining the covariance matrices of the sum and difference beams and the matrices inverse then solving for the unit weight using the following equation $$W = \frac{(R_{\Sigma\Sigma} + R_{\Delta\Delta})^{-1}\delta}{(\delta^H(R_{\Sigma\Sigma} + R_{\Delta\Delta}))^{-1}\delta}.$$

It is a second object of the present invention to provide a method for determining a monopulse ratio using improved adaptive processing techniques which overcome the heretofore limitations on the utility of the monopulse ratio.

It is a further object of the present invention to provide a device capable of developing a clear clutter free radar image using the improved adaptive processing technique to determine a monopulse ratio which is sufficiently free from mainlobe clutter to enable both detecting and angle location determination while eliminating the tedious processes now commonly known in the art.

The monopulse ratio is the ratio of the overall difference beam to the overall sum beam of a radar array. To determine the ratio, an array must first receive a data signal. This data signal is initially processed to develop sum and difference beams. These sum and difference beams are filtered to localize the clutter, which is a portion of the received signal, resulting in final sum and difference beams for each velocity of data signal received by the array. These final sum and difference beams are then adaptively processed in accordance with this invention as follows.

First the sum and difference beams are deterministically beam formed. Secondly the beam formed sum and difference beams are related to a plurality of other deterministically beam formed sum and difference beams. Next the adaptive sum and difference weight is determined. This adaptive weight is then used to determine the overall sum and difference beams. It is these overall sum and difference beams which are used to determine the monopulse ratio, by dividing the difference beam by the sum beam. As a result of common factor cancellation due to the assumption of a single weight for both the sum and the difference beams a monopulse ratio can be preserved.

In the present invention there is also provided a method and apparatus for the cancellation of ground clutter to produce a high quality radar image that can be used for both detecting and tracking of moving objects. This is accomplished by a method for radar detection and tracking of a target using monopulse ratio processing. Initially, a received data signal is staggered to form a signal with a periodic repetition interval (PRI). The received signal is then filtered, and the clutter in the signal is localized. The filtered output is adaptively beam formed and processed to cancel the clutter in the filtered output, and form a final sub-array sum beam and final sub-array difference beam.

One feature of these applications is that the adaptive processing step can be performed using space-time adaptive processing. Additionally, the filter may be a Doppler filter derived using a Fast Fourier Transform. Further, tapering may be applied to reduce sidelobes when adaptively processing the sub-array sum and difference beams.

In yet another aspect there is provided a program storage device readable by a machine, tangibly embodying a program of instruction, executable by said machine to perform method steps for staggering PRI data, deriving a filtered output from a localized clutter signal obtained from the PRI data, adaptively forming a sub-array sum azimuth beam and a sub-array difference azimuth beam from the filtered output, canceling clutter in the filtered output using said sub-array sum beam and said sub-array difference azimuth beam, forming a final sum beam and final difference beam, wherein the final sum beam is used for target detection and the ratio of the final difference beam to the final sum beam is used for angle location determination.

DETAILED DESCRIPTION OF THE PREFERRED EMBODIMENTS

Figure 1:
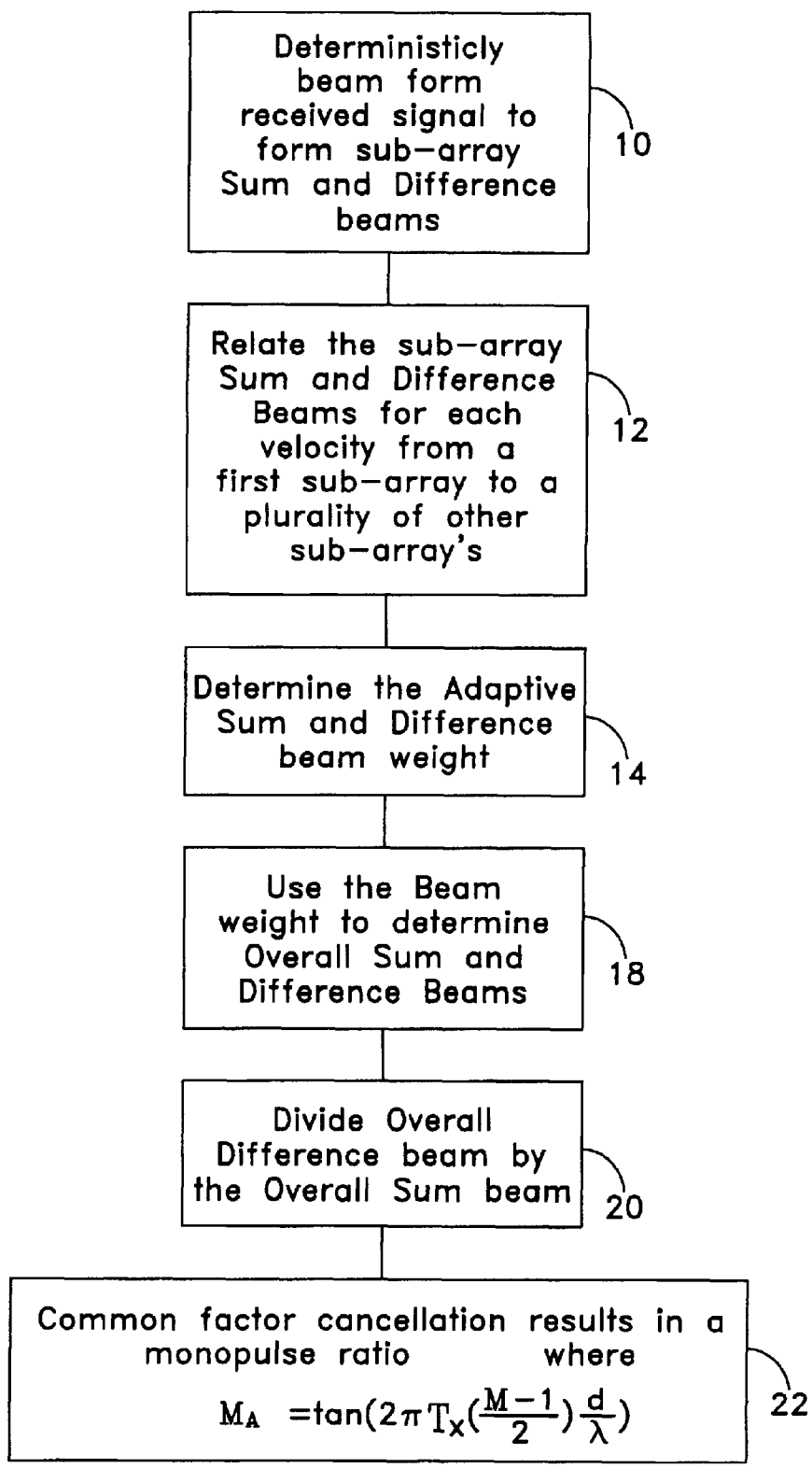
FIG. 1 is a flow chart showing the steps undertaken in determining the monopulse ratio.

The present invention is directed to a method for determination of a single beam weight which can subsequently be used to determine a monopulse ratio, using improved adaptive processing techniques which overcome the heretofore limitations on the utility of the monopulse ratio and can produce a distortion free ratio which can be used for further calculation.

This single beam weight is the result of forcing the two generally separate weights to be represented by a single factor.

Ordinarily the sum and difference weights are individually determined using the equations similar to the following, the weight is determined so that the jamming power J is minimized for respective beams:

$$W_\Sigma = \frac{R_{\Sigma\Sigma}^{-1}\delta}{\delta^H R_{\Sigma\Sigma}^{-1}\delta} \quad W_\Delta = \frac{(R_{\Delta\Delta})^{-1}\delta}{\delta^H R_{\Delta\Delta}^{-1}\delta}$$

$$J_1 = W_\Sigma^H R_{\Sigma\Sigma} W_\Sigma - \lambda(\delta^H W_\Sigma - 1) J_1 = W_\Delta^H R_{\Delta\Delta} W_\Delta - \lambda(\delta^H W_\Delta - 1)$$

Where $R_{\Sigma\Sigma}$ and $R_{\Delta\Delta}$ are the covariance matrixes for the sum and the difference beams respectively, $\delta^H$ is a unit vector with 1 as the first element and 0 as all of the other elements and ($\delta^H W_\Delta - 1$) represents a constraint point on the antenna weight, not the antenna pattern.

However the difference weights can be forced to be equivalent resulting in a slight degradation of the clutter cancellation but permitting a single factor to represent both the sum weight and the difference weight. This weight is then determined by the following equations, which minimize the sum of jamming power in the sum and difference beams:

$$W = \frac{(R_{\Sigma\Sigma} + R_{\Delta\Delta})^{-1}\delta}{(\delta^H (R_{\Sigma\Sigma} + R_{\Delta\Delta}))^{-1}\delta}$$

$$J = W^H(R_{\Sigma\Sigma} + T_{\Delta\Delta})W - \lambda(\delta^H W - 1)$$

The method employed here, resulting in a single weight for sum and difference beams, is possible because unlike the other methods of determining beam weight there are no constraint points on the antenna pattern in the equation used here. The only constraint point represents a constraint on the antenna weight and therefore is not a detrimental factor in the calculation of the single sum and difference weight.

A constraint point is a location, which the graph of the function is forced to go through. Originally, it was thought that the use of a number of constraint points would result in a usable monopulse ratio. However, as discussed above this has not been borne out by the testing. This failure to produce a usable monopulse ratio is largely because of the resource problem that using such constraint points creates, but also because the use of these points creates error in the results when extrapolated beyond the constraint point. This induced error becomes even greater when the number of constraint points is increased or when the graph between the constraint points is of a non-linear type. Therefore the present invention does not use constraint points in the antenna pattern, resulting is the single weight for the sum and difference beams.

As noted above, the monopulse ratio is the ratio of the overall difference beam to the overall sum beam of a radar array. To determine the ratio an array must first receive a data signal. This data signal is initially staggered and then fixed or deterministically beamformed to produce sum and difference beams. These sum and difference beams are filtered to localize the clutter, which is a portion of the received signal, resulting in final sum and difference beams for each velocity of data signal received by the array. These final sum and difference beams are then adaptively processed in accordance with this invention as follows.

First the sub-array sum and difference beams for each velocity of the filtered and staggered sub-array data signal are deterministically beam formed, as in FIG. 1, step 10. Sub-array beam forming results in the following beam patterns given by the following equations:

$$\sum_l (T_x) = \cos\left(2\pi T_x \frac{Md}{2\lambda}\right) \alpha(T_x)$$

$$\Delta_l(T_x) = \sin\left(2\pi T_x \frac{Md}{2\lambda}\right) \alpha(T_x)$$

where:

$$\alpha(T_x) = e^{j2\pi T_x \frac{M-1}{2}\frac{d}{\lambda}} \frac{\sin\left(2\pi T_x \frac{Md}{4\lambda}\right)}{\sin\left(2\pi T_x \frac{d}{2\lambda}\right)}$$

and $\lambda$ is the wavelength, M is the number of columns within each sub-array, d is the distance between the columns, and $T_x$ is the azimuth directional cosine.

Secondly the sub-array beam formed sum and difference beams are related to a plurality of other sub-array beam formed sum and difference beams, step 12. This is accomplished through a relational equation as follows:

$$\sum_n (T_x) = e^{j2\pi T_x(n-1)\frac{D}{\lambda}} \sum_l (T_x), n = 1, 2, \ldots N$$

$$\Delta_n(T_x) = e^{j2\pi T_x(n-1)\frac{D}{\lambda}} \Delta_l(T_x), n = 1, 2, \ldots N$$

Where D is the spacing between the sub-arrays.

The sum and difference weights are forced to be equivalent resulting in a slight degradation of the clutter cancellation but permitting a single factor to represent both the sum weight and the difference weight, step 14. This adaptive weight is then determined by the following equation:

$$W = \frac{(R_{\Sigma\Sigma} + R_{\Delta\Delta})^{-1}\delta}{(\delta^H(R_{\Sigma\Sigma} + R_{\Delta\Delta}))^{-1}\delta}$$

with the following optimization criteria:

$$J = W^H(R_{\Sigma\Sigma} + R_{\Delta\Delta})W - \lambda(\delta^H W - 1)$$

This weight is then used to determine the overall sum and difference beams, step 18. The overall sum and difference beams are represented by the following equations:

$$\Sigma(T_x) = \Sigma_1(T_x) - W_\Sigma(1)\Sigma_2(T_x) - \ldots - W_\Sigma(N-1)\Sigma_N(T_x)$$

$$\Delta(T_x) = \Delta_1(T_x) - W_\Delta(1)\Delta_2(T_x) - \ldots - W_\Delta(N-1)\Delta_N(T_x)$$

It is these overall sum and difference beams which are used to determine the monopulse ratio, by dividing the difference beam by the sum beam, step 20. This can be represented as follows:

$$m_A = \frac{\Delta(T_x)}{\Sigma(T_x)} = \frac{\Delta_1(T_x) - W_\Delta(1)\Delta_2(T_x) - \ldots - W_\Delta(N-1)\Delta(T_x)}{\sum_1(T_x) - W_\Sigma(1)\sum_2(T_x) - \ldots - W_\Sigma(N-1)\sum(T_x)}$$

$$= \frac{\sin\left(2\pi T_x\left(\frac{M-1}{2}\right)\frac{d}{\lambda}\right)\left(1 - W_\Delta(1)e^{j2\pi T_x\frac{D}{\lambda}} \ldots - W_\Delta(N-1)e^{j2\pi T_x(N-1)\frac{D}{\lambda}}\right)}{\cos\left(2\pi T_x\left(\frac{M-1}{2}\right)\frac{d}{\lambda}\right)\left(1 - W_\Sigma(1)e^{j2\pi T_x\frac{D}{\lambda}} \ldots - W_\Sigma(N-1)e^{j2\pi T_x(N-1)\frac{D}{\lambda}}\right)}$$

As a result of common factor cancellation the decomposed sum and difference beams are represented by a sin and cos function respectively. The other now cancelled factor represents the clutter contribution which was included in the signal. As shown in step 22, a monopulse ratio $m_A$ can be determined using the following equation:

$$m_A = \tan\left(2\pi T_x\left(\frac{M-1}{2}\right)\frac{d}{\lambda}\right)$$

There is also provided in the present invention a method for detecting and determining angle location of a moving object from an airborne or space-based radar platform which utilizes signals generated using the monopulse ratio which has been determined as demonstrated above. A signal is transmitted towards the area of which it is desired to produce a radar image. The transmitted signal is then reflected back to the platform where the processing of the returned signal is begun.

Figure 2:
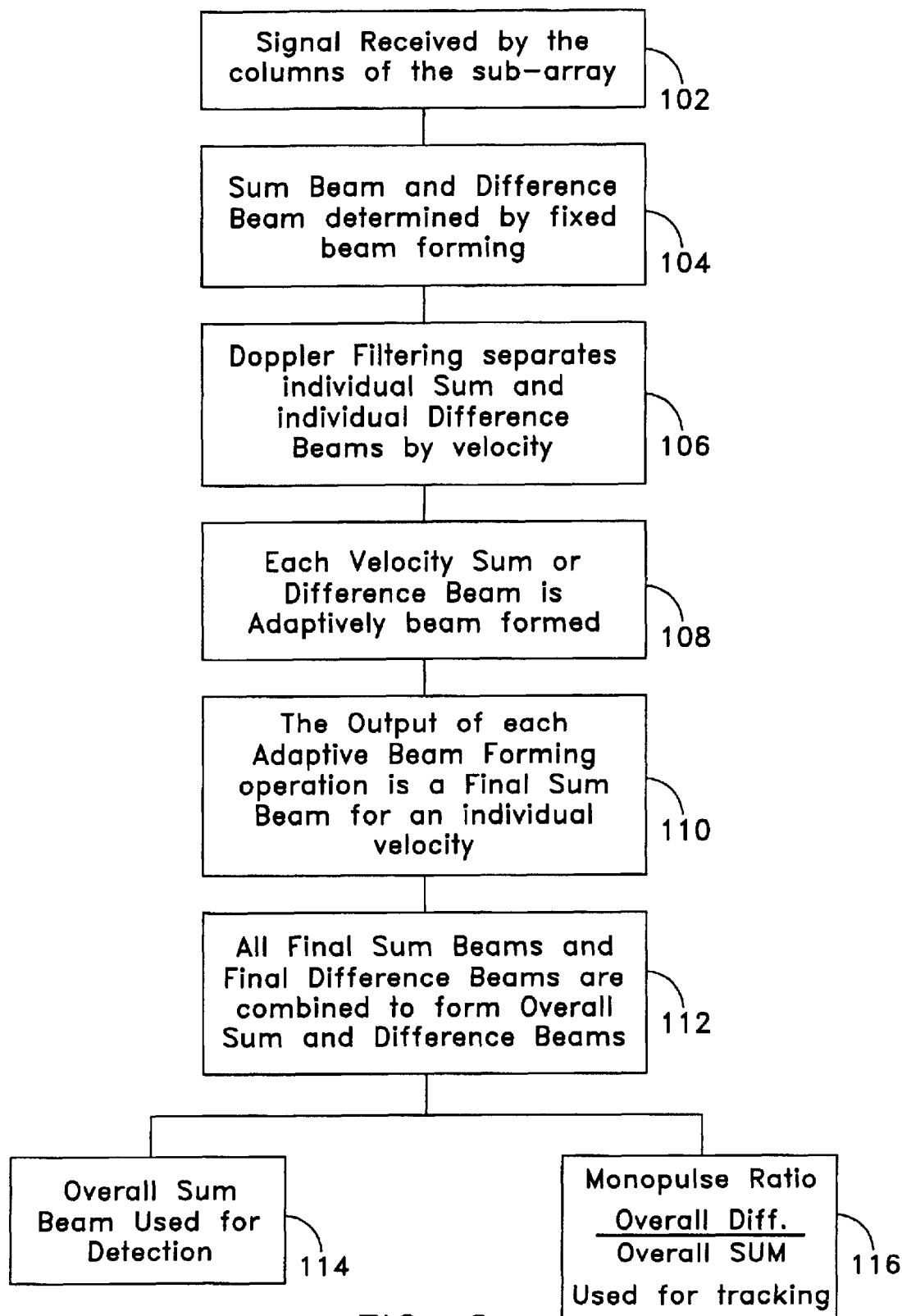
FIG. 2 is a flow chart showing the steps undertaken in the method of detecting and tracking target objects.

As in FIG. 2, in step 102, upon return of the signal to the platform the signal is received by the platform array that is comprised of a plurality of sub-arrays. Each sub-array is further comprised of a plurality of columns. It is each column that receives a portion of the return signal. The portion of the signal that is received by the plurality of columns is then combined using weighting schemes, these weighting schemes are called fixed beam forming 104. Data is extracted from the returned radar signal over a set of illumination pulses, corresponding to the set of pulses which were initially sent at the area to be imaged. The data is staggered to form PRI staggered data. The sum beam is determined as a weighted sum of all the elements of the column. The difference beam is determined as the weighted difference of the two halves of the elements for each column. The sum and difference beams are then filtered to localize any clutter in the received signal, step 106. These filtered sum and difference beams are determined for each velocity or frequency, in step 108. Then in step 110, portions of the signal which correspond to a single velocity or frequency received by the plurality of other sub-arrays are combined and then adaptively beam formed to form a final sum and difference beam for each velocity. These final sum and difference beams are then further combined to create overall sum and difference beams, step 112. It is the overall beams which are then further processed to determine object detection, step 114, and angle location determination for tracking, step 116.

Included in the aforementioned returned signal, it is very likely that there will be at least some clutter. Clutter makes the image of little use to the user, as the object which has been detected cannot be precisely located or tracked when hidden by this clutter. In order to cancel clutter that is in motion relative to the receiver, temporal degrees of freedom are required.

The following is a method for clutter suppression in a sub-array using PRI-staggered post Doppler space-time adaptive processing (STAP). The signal or data that is returned to the platform and formed into sub array sum and difference beams is sent through a filter to localize the clutter as described in step 106. Because of the staggering of the signal, the signal clutter that has been returned as part of the returned signal can be localized. This localization occurs through the use of filters, for the sum beam and for the difference beams respectively. One example of a type of a filter which could be used in this process, is a Doppler filter which is derived using a Fast Fourier Transform (FFT).

The localization process entails the received signal being broken up into a plurality of velocities, there are specific velocities which are known for the clutter, such as zero for stationary clutter. The filtered signal forms sum and difference azimuth beams with localized clutter and there is one sum and one difference beam from each sub array for each velocity. The clutter signal can then be separated because generally it has a velocity of zero, which distinguishes the clutter from the remainder of the signal. The sum or difference beams for each individual velocity from all of the plurality of sub-array's are then combined. These are then STAP processed to cancel the clutter and form the final sub-array sum and difference azimuth beams for each velocity or frequency of the returned signal.

The adaptive beam forming process that is unique to the preferred embodiment can be explained as follows. Typically, tapering is applied to the signal to reduce sidelobes of the returned signal. For illustration purposes, uniform illumination is utilized which leads to the following expression of the sub-array sum and difference azimuth beams for each velocity.

$$\sum_l (T_x) = \cos\left(2\pi T_x \frac{Md}{2\lambda}\right) \alpha(T_x)$$

$$\Delta_l(T_x) = \sin\left(2\pi T_x \frac{Md}{2\lambda}\right) \alpha(T_x)$$

where:

$$\alpha(T_x) = e^{j2\pi T_x \frac{M-1}{2} \frac{d}{\lambda}} \frac{\sin\left(2\pi T_x \frac{Md}{4\lambda}\right)}{\sin\left(2\pi T_x \frac{d}{2\lambda}\right)}$$

In the preceding equations $\Sigma$ is the sum beam, $\Delta$ is the difference beam, $\lambda$ is the wavelength, M is the number of columns within each sub-array, d is the distance between the columns, and $T_x$ is the azimuth directional cosine.

The sum and difference beams for each velocity can then be related to all other sub-array sum and difference beams. The relation of the other sub-array beams can be expressed by the following:

$$\Sigma_n(T_x) = e^{j2\pi T_x(n-1)D/\lambda} \Sigma_1(T_x), n=1,2,\ldots N$$

$$\Delta_n(T_x) = e^{j2\pi T_x(n-1)D/\lambda} \Delta_1(T_x), n=1,2,\ldots N$$

Similarly, the overall sum and difference beam azimuth for the entire array can then be determined using the following expression.

$$\Sigma(T_x) = \Sigma_1(T_x) - W_\Sigma(1)\Sigma_2(T_x) - \ldots - W_\Sigma(N-1)\Sigma_N(T_x)$$

$$\Delta(T_x) = \Delta_1(T_x) - W_\Delta(1)\Delta_2(T_x) - \ldots - W_\Delta(N-1)\Delta_N(T_x)$$

Where $W_\Sigma$ and $W_\Delta$ are the sum and difference adaptive weights which are determined by the processing system to cancel the clutter for each Doppler filter output.

The determination of the overall sum and difference beam azimuths is used by the platform to calculate the monopulse ratio. The sum and difference adaptive weights can be formulated as minimizing the output clutter subject to the constraint that the first element is 1. More specifically, $\delta^H$ is a unit vector with 1 as the first element and 0 for all the other elements. This constraint results in the following series of equations where $R_{\Sigma\Sigma}$ is the covariance matrix of the sum channels and $R_{\Delta\Delta}$ is the covariance matrix of the difference channels. A covariance matrix is the matrix of the relation of all the elements of the array.

In order to maintain azimuth monopulse accuracy by allowing degradation in clutter suppression, one can demonstrate the adaptive processing weights, both sum and difference, by the following equations where J represents the output power of the jamming or ground clutter:

$$W = \frac{(R_{\Sigma\Sigma} + R_{\Delta\Delta})^{-1} \delta}{(\delta^H (R_{\Sigma\Sigma} + R_{\Delta\Delta}))^{-1} \delta}$$

In the calculation of the monopulse ratio, the use of a single weight for the sum and difference beam weights enables common factor cancellation leading to monopulse reservation and the monopulse ratio ($m_A$) as demonstrated in the following equations:

$$m_A = \frac{\Delta(T_x)}{\Sigma(T_x)} = \frac{\Delta_1(T_x) - W_\Delta(1)\Delta_2(T_x) - \ldots - W_\Delta(N-1)\Delta(T_x)}{\Sigma_1(T_x) - W_\Sigma(1)\Sigma_2(T_x) - \ldots - W_\Sigma(N-1)\Sigma(T_x)}$$

$$= \frac{\sin\left(2\pi T_x \left(\frac{M-1}{2}\right)\frac{d}{\lambda}\right)\left(1 - W_\Delta(1)e^{j2\pi T_x \frac{D}{\lambda}} \ldots - W_\Delta(N-1)e^{j2\pi T_x(N-1)\frac{D}{\lambda}}\right)}{\cos\left(2\pi T_x \left(\frac{M-1}{2}\right)\frac{d}{\lambda}\right)\left(1 - W_\Sigma(1)e^{j2\pi T_x \frac{D}{\lambda}} \ldots - W_\Sigma(N-1)e^{j2\pi T_x(N-1)\frac{D}{\lambda}}\right)}$$

$$= \tan\left(2\pi T_x \left(\frac{M-1}{2}\right)\frac{d}{\lambda}\right)$$

Although the ratio preservation is only accomplished through the use of a degradation in clutter cancellation capability this degradation should be small when there is a high clutter to noise ratio. This degradation is based upon the assumption that the weights are the same however, as earlier stated any difference in the weights should be very slight at high signal to noise ratios.

This ratio is then used for the tracking of moving targets, and the final sum beam is used for target object detection.

Figure 3:
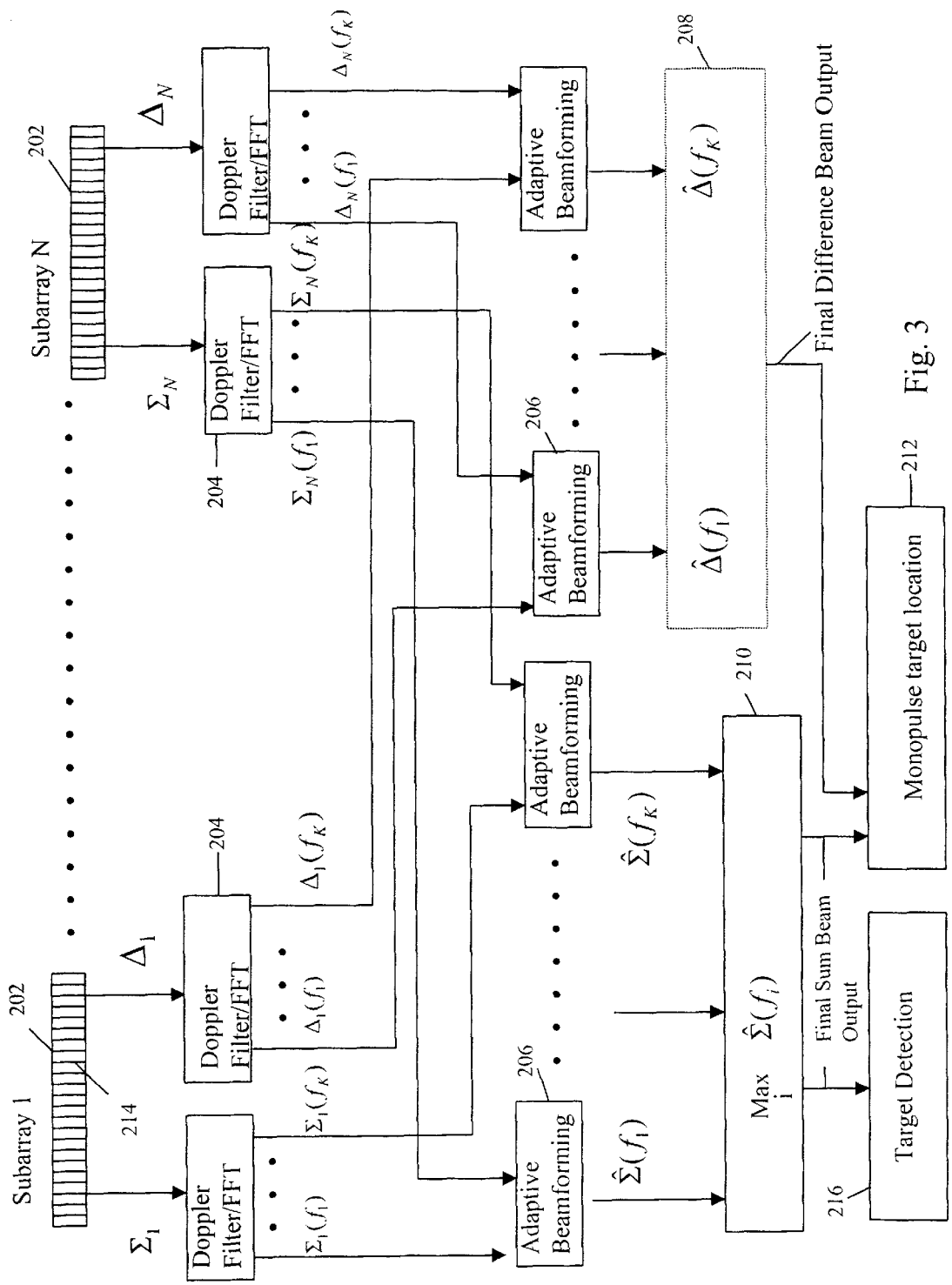
FIG. 3 is a schematic diagram showing the radar apparatus for tracking and detecting.

Another aspect of the present invention is an apparatus schematically shown in FIG. 3 for the utilization of the radar detection and tracking method as taught above. The apparatus is comprised of a radar array (not shown) which is itself comprised of a plurality of sub-arrays 202. Each sub-array is further comprised of a plurality of columns 214. The apparatus has a means for receiving a signal which has reflected off an object in the scope of a transmitted signal. The apparatus includes a plurality of sub-arrays for receiving the signal, the sub-arrays comprised of columns, and means for processing the signal to form a radar image.

The returned signal is filtered and localized by a localizing means 204. The output of the filter will then be routed to an adaptive processor, 206, which beam forms the signal and cancels the clutter 206. The resulting final sub-array sum azimuth beam and difference azimuth beam are then used by the detection and tracking means of the apparatus for resolving a radar image free of ground clutter. In feature 206, all of the sum beams are combined to form an overall sum beam. This overall sum beam is used in feature 216 for target detection. The difference beams are combined in item 206 to form an overall difference beam. The overall sum and difference beams are used in feature 212 to form the monopulse ratio which is used for target tracking and angle location determination.

One feature of this embodiment, is that the adaptive processing may be performed using space-time adaptive processing techniques. Additionally, tapering may be applied to the signal by the adaptive processor to reduce the sidelobes of the sub-array beam formed signal. Further, features include the filtering means being a Doppler filter which may be derived using a FFT.

Further, the apparatus has a means for determining a sum weight and a difference weight and from these determining a monopulse ratio, which is necessary for the tracking aspect of the present invention.

A further feature of the present invention is a program storage device readable by a machine, tangibly embodying a program of instruction, executable by said machine to perform method steps for staggering periodic repetition interval (PRI) data, deriving a filtered output from a localized clutter signal obtained from the PRI data, adaptively forming a sub-array sum azimuth beam and a sub-array difference azimuth beam from the filtered output, canceling clutter in the filtered output using said sub-array sum beam and said sub-array difference azimuth beam, forming a final sum beam and final difference beam, wherein the final sum beam is used for target detection and the ratio of the final difference beam to the final sum beam is used for determining the location of the object, which is also known as targeting.

While this invention has been particularly shown and described with respect to preferred embodiment thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed:

1. A method for determining a single sum and difference beam weight comprising:

taking data samples;

determining covariance matrices for the sum and difference beams;

determining the covariance matrices inverse;

and solving for a weight (W) in the following equation $$W = \frac{(R_{\Sigma\Sigma} + R_{\Delta\Delta})^{-1}\delta}{(\delta^H(R_{\Sigma\Sigma} + R_{\Delta\Delta}))^{-1}\delta}$$

where:

$\delta^H$—is a unit vector with 1 as the first element and all other elements are 0;

$^H$—is a Hermitian notation including equating conjugate and transpose;

$R_{\Sigma\Sigma}$—is the covariance matrix measurement of the sum channels;

$R_{\Delta\Delta}$—is the covariance matrix measurement of the difference channels.

2. A method for reducing total jamming power in sum and difference beams, the jamming power associated with interfering signals within a received data signal, comprising:

determining the product of a single sum and difference beam weight W and the sum of the respective covariance matrices of the sum and difference beams, where the weight is constrained such that the first element is equal to 1 but otherwise having no constraint points on the antenna pattern, as shown in the following equation:

$$J = W^H(R_{\Sigma\Sigma} + R_{\Delta\Delta})W - \lambda(\delta^H W - 1)$$

where:

($\delta^H W - 1$) is a constraint point of the antenna weight and not of the antenna pattern; and determining overall sum and difference beams using the single beam weight W.

3. A method for determination of a monopulse ratio comprising:

receiving a data signal and beamforming the signal to provide first sub-array sum and difference beams represented by the following equations:

$$\sum_l (T_x) = \cos\left(2\pi T_x \frac{Md}{2\lambda}\right)\alpha(T_x)$$

$$\Delta_l(T_x) = \sin\left(2\pi T_x \frac{Md}{2\lambda}\right)\alpha(T_x)$$

where $$\alpha(T_x) = e^{j2\pi T_x \frac{M-1d}{2\lambda}} \frac{\sin\left(2\pi T_x \frac{Md}{4\lambda}\right)}{\sin\left(2\pi T_x \frac{d}{2\lambda}\right)}$$

and $\lambda$ is the wavelength, M is the number of columns within each sub-array, d is the distance between the columns, and $T_x$ is the azimuth directional cosine;

relating the first sub array sum and the difference beams to a plurality of sub array sum and difference beams using the following equations:

$$\sum_n (T_x) = e^{j2\pi T_x(n-1)\frac{D}{\lambda}} \sum_l (T_x), n = 1, 2, \ldots N$$

$$\Delta_n(T_x) = e^{j2\pi T_x(n-1)\frac{D}{\lambda}} \Delta_l(T_x), n = 1, 2, \ldots N$$

where

D is the spacing between the sub-arrays;

determining a single sum and a difference weight using the following equations:

$$W = \frac{(R_{\Sigma\Sigma} + R_{\Delta\Delta})^{-1}\delta}{(\delta^H(R_{\Sigma\Sigma} + R_{\Delta\Delta}))^{-1}\delta}$$

where $\delta^H$—is a unit vector with 1 as the first element and all other elements are 0;

$^H$—is a Hermitian notation including equating conjugate and transpose;

$R_{\Sigma\Sigma}$:—is the covariance matrix measurement of the sum channels;

$R_{\Delta\Delta}$—is the covariance matrix measurement of the difference channels;

adaptively beam forming sum and difference beams to determine an overall sum and difference beam as shown in the following equations:

$$\Sigma(T_x) = \Sigma_1(T_x) - W_\Sigma(1)\Sigma_2(T_x) - \ldots - W_\Sigma(N-1)\Sigma_N(T_x)$$

$$\Delta(T_x) = \Delta_1(T_x) - W_\Delta(1)\Delta_2(T_x) - \ldots - W_\Delta(N-1)\Delta_N(T_x)$$

calculating the monopulse ratio ($m_A$) using the overall sum and difference beams using the following equations:

$$m_A = \frac{\Delta(T_x)}{\Sigma(T_x)} = \frac{\Delta_1(T_x) - W_\Delta(1)\Delta_2(T_x) - \ldots - W_\Delta(N-1)\Delta_N(T_x)}{\Sigma_1(T_x) - W_\Sigma(1)\Sigma_2(T_x) - \ldots - W_\Sigma(N-1)\Sigma_N(T_x)}$$

$$m_A = \frac{\sin\left(2\pi T_x\left(\frac{M-1}{2}\right)\frac{d}{\lambda}\right)\left(1 - W_\Delta(1)e^{j2\pi T_x \frac{D}{\lambda}} \ldots - W\Delta(n-1)e^{j2\pi T_x \frac{(N-1)D}{\lambda}}\right)}{\cos\left(2\pi T_x\left(\frac{M-1}{2}\right)\frac{d}{\lambda}\right)\left(1 - W_\Sigma(1)e^{j2\pi T_x \frac{D}{\lambda}} \ldots - W_\Sigma(n-1)e^{j2\pi T_x \frac{(N-1)D}{\lambda}}\right)}$$

wherein the monpulse ratio can be preserved as the following equation:

$$m_A = \tan\left(2\pi T_x \frac{M-1}{2}\right)\frac{d}{\lambda}.$$

4. A method for radar detection and tracking of a target using monopulse ratio processing in a sub-array comprising:
   receiving a data signal;
   forming and staggering a plurality sum and difference beams using fixed beam forming;
   filtering the received staggered plurality of sum and difference beams to localize clutter and form a plurality of sub-array sum and difference beams for each velocity; and
   adaptively processing the plurality of sub-array sum and difference beams to cancel the localized clutter and form a plurality of final sub-array sum beams and a plurality of final sub-array difference beams for the sub array,
   said adaptive processing including the determination of a sum and difference beam weight where power associated with interfering signals within said data signal is equated to a product of the weight and the respective covariance matrices of the sum and difference beams in order to reduce jamming power within the sum and difference beams.

5. A method according to claim 4, where the adaptive processing step is performed using space-time adaptive processing.

6. A method according to claim 4, where the filtering is Doppler filtering derived using a Fast Fourier Transform.

7. A method according to claim 4, where tapering is applied to reduce sidelobes of the received signal.

8. A method according to claim 4, where sub-array sum and difference azimuth beams are determined by the following equations:

$$\Sigma_1(T_x) = \cos\left(2\pi T_x \frac{Md}{2\lambda}\right)\alpha(T_x)$$

$$\Delta_1(T_x) = \sin\left(2\pi T_x \frac{Md}{2\lambda}\right)\alpha(T_x)$$

where:

$$\alpha(T_x) = e^{j2\pi T_x \frac{M-1d}{2\lambda}} \frac{\sin\left(2\pi T_x \frac{Md}{4\lambda}\right)}{\sin\left(2\pi T_x \frac{d}{2\lambda}\right)}$$

and where:
$\Sigma$ is the sum beam;
$\Delta$ is the difference beam;
$\lambda$ is the wavelength;
M is the number of columns within each sub-array;
d is the distance between the columns; and
$T_x$ is the azimuth directional cosine.

9. A method according to claim 4, where the sum and difference beams of a plurality of sub-arrays can be related to the sum and difference beams of a first sub-array by the following equations:

$$\Sigma_n(Tx) = e^{j2\pi T_x(n-1)D/\lambda}\Sigma_1(T_x), n=1,2,\ldots N$$

$$\Delta_n(Tx) = e^{j2\pi T_x(n-1)D/\lambda}\Delta_1(T_x), n=1,2,\ldots N$$

where:
D is the spacing between sub-arrays.

10. A method according to claim 4, where the weight of the sum and difference beam is determined by equating the jamming power (J) to a product of the weight and the respective covariance matrices of the sum and difference beams, as shown in the following equations:

$$W = \frac{(R_{\Sigma\Sigma} + R_{\Delta\Delta})^{-1}\delta}{(\delta^H(R_{\Sigma\Sigma} + R_{\Delta\Delta}))^{-1}\delta}.$$

$$J = W^H(R_{\Sigma\Sigma}+R_{\Delta\Delta})W-\lambda(\delta^H W-1).$$

11. A method according to claim 4, where the overall sum and overall difference beams of an array is given by the following equations:

$$\Sigma(T_x)=\Sigma_1(T_x)-W_\Sigma(1)\Sigma_2(T_x)-\ldots-W_\Sigma(N-1)\Sigma_N(T_x)$$

$$\Delta(T_x)=\Delta_1(T_x)-W_\Delta(1)\Delta_2(T_x)-\ldots-W_\Delta(N-1)\Delta_N(T_x)$$

where $W_\Sigma$ and $W_\Delta$ are the adaptive sum and difference weights which are chosen to cancel clutter for each filtered output.

12. A method according to claim 4, where the overall sum beam is used for target object detection and the ratio of the overall difference beam to the overall sum beam is used for target object angle location determination.

13. A method according to claim 11, where each sub-array pattern is then separable, and a monopulse ratio can be derived by the following ratio:

$$m_A = \frac{\Delta(T_x)}{\Sigma(T_x)} = \frac{\Delta_1(T_x) - W_\Delta(1)\Delta_2(T_x) - \ldots - W_\Delta(N-1)\Delta_N(T_x)}{\Sigma_1(T_x) - W_\Sigma(1)\Sigma_2(T_x) - \ldots - W_\Sigma(N-1)\Sigma_N(T_x)}$$

$$m_A = \frac{\sin\left(2\pi T_x\left(\frac{M-1}{2}\right)\frac{d}{\lambda}\right)\left(1 - W_\Delta(1)e^{j2\pi T_x \frac{D}{\lambda}} \ldots - W\Delta(N-1)e^{j2\pi T_x \frac{(N-1)D}{\lambda}}\right)}{\cos\left(2\pi T_x\left(\frac{M-1}{2}\right)\frac{d}{\lambda}\right)\left(1 - W_\Sigma(1)e^{j2\pi T_x \frac{D}{\lambda}} \ldots - W_\Sigma(N-1)e^{j2\pi T_x \frac{(N-1)D}{\lambda}}\right)}$$

$$m_A = \tan\left(2\pi T_x \frac{M-1}{2}\right)\frac{d}{\lambda}.$$

14. An apparatus for detection and tracking of a target using monopluse ratio processing comprising:
   an array comprised of a plurality of sub-arrays for receiving a signal containing data;
   each sub-array being comprised of a plurality of columns
   each sub-array receiving data signals;
   means for fixed beam forming of the received data signals;
   means for staggering the received data signals;
   a filter which filters and localizes clutter which is a component of said received data signals;
   an adaptive processor which takes the filter output and cancels the clutter; and a means for determining a sum and difference beam weight where the jamming power associated with interfering signals within the received data signals is equated to a product of the weight and the respective covariance matrices of the sum and difference beams.

15. An apparatus according to claim 14, wherein the adaptive processor utilized space-time adaptive processing.

16. An apparatus according to 14, wherein the filter is a Doppler filter derived from a Fast Fourier Transform.

17. An apparatus according to claim 14, wherein the adaptive processor has means for tapering the sub-array beam formed data to reduce sidelobes.

18. An apparatus according to claim 14, wherein there are means for relating a plurality of sub-array sum and difference beams to another sub-array sum and difference beams to determine overall sum and difference beams which are utilized by the detection and tracking means, the overall sum beam being used for target detection and the ratio of the overall difference beam to the overall sum beam is used for target angle location determination.

19. A program storage device readable by a machine, tangibly embodying a program of instruction, executable by said machine to perform method steps for:

receiving a data signal;

forming and staggering a plurality sum and a plurality of difference beams using fixed beam forming;

filtering the received staggered plurality of sum and difference beams to localize clutter in the plurality of sum and azimuth beams to form a plurality of final sub-array sum and a plurality of final sub array difference beams where each beam is representative of a velocity;

adaptively processing the plurality of sub-array sum beams and the plurality of sub-array difference beams to cancel the localized clutter and form an overall sum beam and an overall difference beam;

determining a sum and difference beam weight where power associated with interfering signals within said data signal is equated to a product of the weight and the respective covariance matrices of the sum and difference beams in order to reduce jamming power within the overall sum and difference beams.

20. A program storage device according to claim 19, where sub-array sum and difference beams are determined by the following equations:

$$\Sigma_1(T_x) = \cos\left(2\pi T_x \frac{Md}{2\lambda}\right) \alpha(T_x)$$

$$\Delta_1(T_x) = \sin\left(2\pi T_x \frac{Md}{2\lambda}\right) \alpha(T_x)$$

where:

$$\alpha(T_x) = e^{j2T_x \frac{M-1d}{2\lambda}} \frac{\sin\left(2\pi T_x \frac{Md}{4\lambda}\right)}{\sin\left(2\pi T_x \frac{d}{2\lambda}\right)}$$

and where:

$\Sigma$ is the sum beam;

$\Delta$ is the difference beam;

$\lambda$ is the wavelength;

M is the number of columns within each sub-array;

d is the distance between the columns; and $T_x$ is the azimuth directional cosine.

21. A program storage device according to claim 19, where sum and difference beams of the first sub array are related to the another sub-array by the following equation:

$$\Sigma_n(Tx) = e^{j2\pi T_x(n-1)D/\lambda} \Sigma_1(T_x), n=1,2, \ldots N$$

$$\Delta_n(T_x) = e^{j2\pi T_x(n-1)D/\lambda} \Delta_1(T_x), n=1,2, \ldots N$$

where:

D is the spacing between sub-arrays.

22. A program storage device according to claim 19, where the weight of the sum and difference beam is determined by equating the output power (J) to a product of the weight and the respective covariance matrices of the sum and difference beams, as shown in the following equations:

$$W = \frac{(R_{\Sigma\Sigma} + R_{\Delta\Delta})^{-1}\delta}{(\delta^H(R_{\Sigma\Sigma} + R_{\Delta\Delta}))^{-1}\delta}$$

$$J = W^H(R_{\Sigma\Sigma} + R_{\Delta\Delta})W - \lambda(\delta^H W - 1).$$

23. A program storage device according to claim 19, where the overall sum and difference beams of sub-array is given by the following equation:

$$\Sigma(T_x) = \Sigma_1(T_x) - W_\Sigma(1)\Sigma_2(T_x) - \ldots - W_\Sigma(N-1)\Sigma_N(T_x)$$

$$\Delta(T_x) = \Delta_1(T_x) - W_\Delta(1)\Delta_2(T_x) - \ldots - W_\Delta(N-1)\Delta_N(T_x)$$

where $W_\Sigma$ and $W_\Delta$ are adaptive sum and difference weights which are chosen to cancel clutter for each filtered output.

24. A program storage device according to claim 23, where each sub-array pattern is then separable, and a monopulse ratio can be derived by the following equation:

$$m_A = \frac{\Delta(T_x)}{\Sigma(T_x)} = \frac{\Delta_1(T_x) - W_\Delta(1)\Delta_2(T_x) - \ldots - W_\Delta(N-1)\Delta_N(T_x)}{\Sigma_1(T_x) - W_\Sigma(1)\Sigma_2(T_x) - \ldots - W_\Sigma(N-1)\Sigma_N(T_x)}$$

$$m_A = \frac{\sin\left(2\pi T_x\left(\frac{M-1}{2}\right)\frac{d}{\lambda}\right)\left(1 - W_\Delta(1)e^{j2\pi T_x \frac{D}{\lambda}} \ldots - W\Delta(n-1)e^{j2\pi T_x \frac{(N-1)D}{\lambda}}\right)}{\cos\left(2\pi T_x\left(\frac{M-1}{2}\right)\frac{d}{\lambda}\right)\left(1 - W_\Sigma(1)e^{j2\pi T_x \frac{D}{\lambda}} \ldots - W_\Sigma(n-1)e^{j2\pi T_x \frac{(N-1)D}{\lambda}}\right)}$$

$$m_A = \tan\left(2\pi T_x \frac{M-1}{2}\right)\frac{d}{\lambda}.$$

* * * * *